Nov. 15, 1938.  W. B. WEAVER  2,136,899
CASTING BRAKE SHOES CENTRIFUGALLY
Original Filed April 4, 1930  2 Sheets-Sheet 2
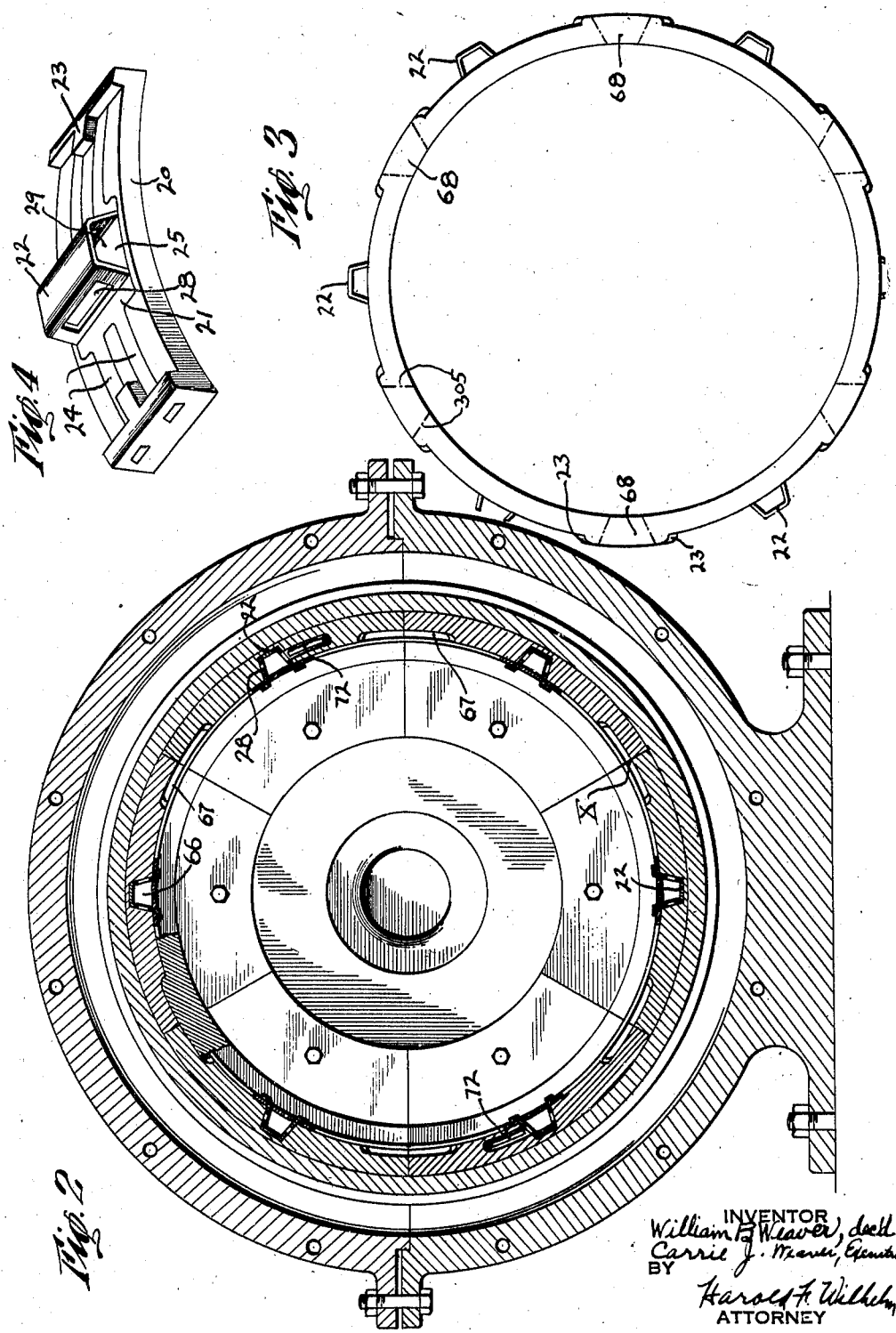

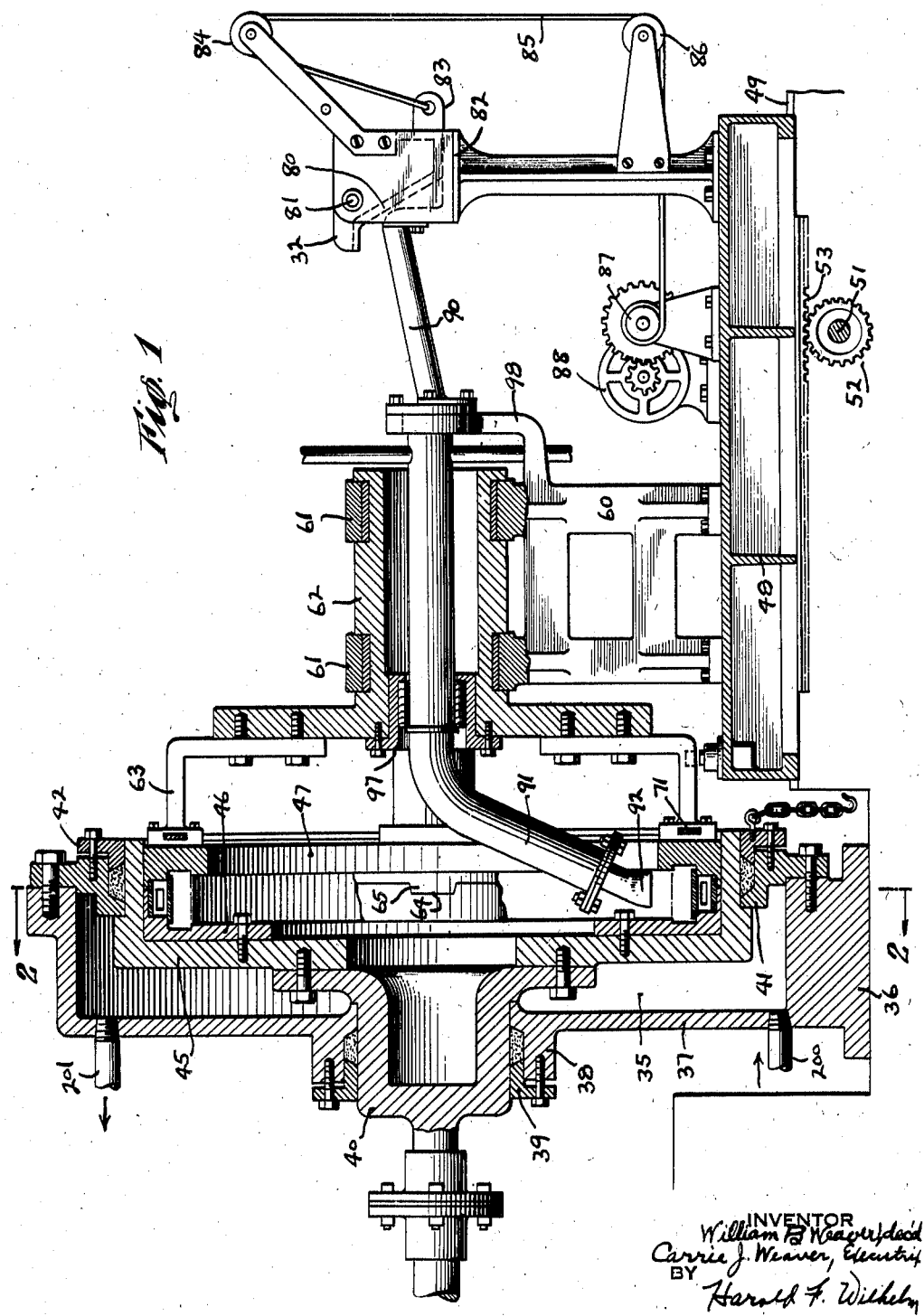

Patented Nov. 15, 1938

2,136,899

UNITED STATES PATENT OFFICE 2,136,899

CASTING BRAKE SHOES CENTRIFUGALLY

William B. Weaver, deceased, late of Birmingham, Ala., by Carrie J. Weaver, executrix, Birmingham, Ala.

Original application April 4, 1930, Serial No. 441,481. Divided and this application January 13, 1936, Serial No. 58,833

3 Claims. (Cl. 29—152.1)

The invention relates to the making of brake shoes, and more particularly to casting brake shoes centrifugally.

The objects of the invention include the provision of a relatively simple, dependable, highly efficient and convenient process and product of the type above indicated.

Various further and more specific objects, features and advantages will clearly appear from the detailed description given below taken in connection with the accompanying drawings, which form a part of this specification and illustrate by way of example one embodiment which the invention may take.

This application is a division of application Ser. No. 441,481, filed April 4, 1930, entitled Method and apparatus for casting brake shoes centrifugally.

In the drawings:

Fig. 1 is a vertical section through a casting machine unit for carrying out the process;

Fig. 2 is a section on the line 2—2 of Fig. 1;

Fig. 3 illustrates the complete ring of brake shoes when cast, according to the invention;

Fig. 4 is a perspective of a completed brake shoe.

In the following description and in the claims part will be identified by specific names for convenience, but they are intended to be as generic in their application to similar parts as the art will permit.

Like reference characters denote like parts in the several figures of the drawings.

Referring now to the drawings, and more particularly to Figs. 3 and 4, one type of brake shoe is shown for the purposes of illustration, but it will be appreciated that other types of brake shoes may be made, according to the teachings of the invention. The brake shoe comprises an insert, indicated by 21, having a central portion 25 and opposed legs 24. A U-shaped pin holder 22 is secured to the insert 21 in any desired manner as by welding or by tongue-and-slot connections. The bending of the pin holder 22 forms a hole 29, and further holes 28 are provided in the sides of the pin holder for assisting in attachment to the rigging of the braking mechanism on the railroad freight car, or other apparatus on which the shoe is used.

The metal insert 21 with the assembled pin holder 22 is cast within a body of metal 20, which forms the body of the brake shoe. The brake shoe has T-shaped lugs 23 on the ends thereof to cooperate with the brake rigging of the car on which the brake shoe is used.

Having described the construction of one particular type of brake shoe, the machine for casting the brake shoe will now be described. Referring now to Fig. 1, the casting machine unit comprises a base 36 having a wall 37 secured thereto, which in turn supports a bearing 38 in which is journalled a hub 40, which is secured to the drive shaft of a suitable motor (not shown) through a suitable coupling. A suitable gland and packing, indicated by 39, is provided for making a water-tight joint. Also secured to the base 36 is a bearing 41, which supports a mold carrier 45. A further gland and packing, indicated by 42, is provided for forming a water seal at this point.

The centrifugal mold proper comprises a mold carrier 45, which is bolted to the hub 40. It will be understood that the mold carrier 45 and hub 40 are journalled in the bearings 38 and 41, and that water is introduced into the space indicated by 35 therebetween. Cooling water may be introduced through pipe 200, and may leave through pipe 201. If desired, the bearing 38 may be arranged to take substantially all of the weight of the rotary mold.

Bolted to the mold carrier 45 is an axially fixed mold section 46. Also fitting within the mold carrier 45 is a removable mold section 47, which is secured to the arms 63.

An axially moving carriage 48 rests upon suitable tracks 49, and has a rack 53 secured to the underside thereof. A drive shaft 51 is suitably journalled on a fixed base and carries a spur gear 52 meshing the rack 53. Suitable driving devices (not shown) are provided to drive shaft 51 for moving the carriage 48 axially.

Carriage 48 carries a support 60, which carries bearings 61, in which is journalled a hub 62, which, in turn, carries the arms 63. Thus, it will be seen that by moving the carriage 48 to the right in Fig. 1, the mold section 47 may be separated from the mold section 46.

It will be understood that the mold sections 46 and 47 are suitable shaped to mold the ring of brake shoes indicated in Fig. 3. As shown in Fig. 2, the mold has a plurality of recesses 66 for the pin holders 22 and a plurality of recesses 67 for the lugs 23 and intermediate body of metal 68. In addition, the mold section 47 is provided with a plurality of tongues 65, which fit in grooves 64 in the mold section 46 in such relation as to insure the parts always fitting in the same relation to each other.

The inserts 21 are formed from a strip of heavy sheet metal stamped to shape, except that the individual inserts are not separated at the time but are left in the form of a continuous strip of inserts. The pin holders 22 are then secured to the inserts as explained above.

A ring of such inserts having the pin holders 22 assembled in position, is placed in the mold as indicated in Figs. 1 and 2. To assist in holding this ring of inserts in position before the metal is poured, and to assist also in removing the ring of brake shoes from the mold, a holding arrangement is provided.

Referring more particularly to Figs. 1 and 2, the mold sections 46 and 47 are provided with aligned recesses, in which a pair of diametrically opposed L-shaped hooks 72 are provided. The end of hook 72 is adapted to pass through the holes 28 of the pin holder 22, as shown in Fig. 2. The hooks 72 are secured to a ring 71. The ring 71 is supported in suitable guides between the arms 62 on the mold section 47 in such manner that the ring 71 is circumferentially movable, as explained hereinafter, to move the hooks 72 into and out of engagement with the pin holders 22.

For pouring the cast iron a pouring arrangement 32 is provided. The pouring arrangement comprises a ladle 80 pivoted by pivot 81 on a support 82, which is carried by carriage 48. A pair of rollers 84 and 86 are supported by the pedestal 82, and a line 85 passes over these rollers. The line 85 is fastened at one end to a lug 83 secured to the ladle 80, and at the other end it passes around a drum 87 which is driven by a motor 88, both of which are mounted on the carriage 48. Thus, it will be seen by driving motor 88 the ladle 80 may be lifted about its pivot 81, and the contents poured into trough 90.

To carry the molten metal into the mold a trough 90, a water-cooled pipe 91 and a spout 92 are provided. The water-cooled pipe 91 is carried by a roller bearing 97 and by a support 98. The trough 90 may be clay lined.

To carry out the process of making a brake shoe according to the invention and utilizing the apparatus above described, a ring of material to form the inserts, as indicated in Figs. 1 and 2, is formed of sufficient length to fit within the molding machine. This material may be of steel and the ends of the ring may be arranged to come at a point between the finished brake shoes, as at the point X (Fig. 2). The pin holders 22 are secured in position to the ring and the composite insert is placed in the mold with the pin holders in the recesses 66. If convenient, the insert assembly may be placed in the mold after it is closed, as shown in Fig. 2, or it may be placed in the mold with the mold in open position. If the latter procedure is desirable, the mold is closed by moving the carriage 48. The mechanism is then operated to rotate ring 71 which causes the hooks 72 to engage in the pin holders 22 of opposite shoes of the ring of brake shoes, as indicated particularly in Fig. 2.

The main motor (not shown) is started and the centrifugal mold is driven up to suitable speed for centrifugal casting. The exact amount of molten iron is placed in the ladle 80 by a suitable bucket or other mechanism (not shown) for casting a ring of brake shoes. It will be understood that sufficient iron must be placed in the ladle 80 to form a ring of brake shoes whose inside diameter is substantially equal to the diameter of the wheel with which they are to work.

When the main motor has gotten the centrifugal molds up to speed, the ladle tilting motor 88 is started and the ladle 80 is tipped, pouring the molten metal into the trough 90 whence it flows through pipe 91 and spout 92 into the annular mold space. It will be understood that spout 92 is so arranged and is disposed in such position and direction to fill the mold space while the mold is rotating with a minimum of splashing of the molten iron.

The molds are rotated until the iron is set, at which time the main motor is stopped. The ring of brake shoes is preferably removed from the mold while still at a bright yellow heat to increase the life of the mold. The carriage motor is then started and the carriage moves and opens the mold. The hooks 72 being engaged with the ring of brake shoes assist in pulling the entire ring of brake shoes with the movable mold section 47. The ring 71 is rotated moving the hooks 72 from the holes 28 in the pin holders 22, thus permitting the ring of brake shoes to be removed from the movable mold section 47. The machine is then ready for casting another ring of brake shoes.

The ring of brake shoes just delivered from the machine is next taken to a cutting machine (not shown) where the brake shoes are cut along the lines 305, as indicated in Fig. 3, to form the individual brake shoes and the intermediate blocks of metal 68 are returned to the melting furnace. The individual brake shoes may then go to an annealing furnace by means of a conveyor (not shown). After the shoes are annealed, they may be dropped into a sorter which delivers them to a chilling machine where the ends of the brake shoes are chilled.

If desired, instead of casting the brake shoes in the form of a single ring, the mold may be so arranged that the ring is discontinuous, and each brake shoe is cast separately. In this case a separate hook 72 will be needed to hold each individual insert and completed brake shoe in position. Also, if desired, suitable automatic controls may be provided for operating the several motors at predetermined intervals, so that all of the above recited steps may be carried on substantially automatically and with a minimum of human attention.

The apparatus described, according to the invention, has numerous advantages over the ordinary sand molds used for casting brake shoes commercially. The invention provides a permanent mold which can be used over and over again. It permits casting of a plurality of shoes simultaneously in the same mold. Ordinarily with the usual wheels, such as freight car wheels, about six shoes may be cast in the same mold making a total of twelve shoes being cast simultaneously with the double apparatus above described. Furthermore, the invention has the advantage of causing an intimate connection between the insert and body of the shoe due to large centrifugal forces exerted upon the molten metal. Furthermore, it will be seen, especially from Fig. 4, that the members 24 of the insert are made dovetail in shape to augment the connection between the insert and body of cast iron.

As a further advantage the present invention greatly speeds up the process of manufacture. It only takes a very few minutes for the molten metal to set and the brake shoes are removed as soon as possible from the machine. The present invention also entirely eliminates sand molds with the well-known attendant difficulties, both as to space required, labor necessary, and time required for making the molds.

It is within the contemplation of this invention to utilize the same practices as much as possible as are used in making cast iron pipe by the centrifugal process. Ordinary gray iron will probably be found suitable for the permanent mold parts, and the practice of removing the castings from the machine as soon as possible after they are set, thereby keeping the machine at as near a uniform temperature as possible, will be found to be advantageous in increasing the life of the mold.

While certain novel features of the invention have been shown and described and are pointed out in the annexed claims, it will be understood that various omissions, substitutions and changes may be made by those skilled in the art without departing from the spirit of the invention.

What is claimed is:

1. The method of making brake shoes which comprises placing circularly arranged inserts in an annular mold, rotating the mold, pouring molten metal into said mold to adhere to said inserts to form the brake shoe bodies, stopping said mold when the molten metal has set and separating the mold, and removing the brake shoes while at orange heat.

2. As an article of manufacture, a brake shoe formed of centrifugally cast metal and having a back secured thereto.

3. The method of making braking elements which comprises placing a one-piece annular backing member of sufficient size to make a plurality of brake elements in a centrifugal mold, rotating the mold, pouring molten wearing material into said mold to cause it to adhere to the inner surface of said backing member, removing the molded product from said mold after said wearing material has set, and thereafter cutting said molded product into individual braking elements.

WILLIAM B. WEAVER, Deceased,
By CARRIE J. WEAVER,
*Executrix.*